United States Patent [19]

Onopchenko et al.

[11] 3,895,037

[45] July 15, 1975

[54] PROCESS FOR PREPARING A DIPHENYL CARBINOL CARBOXYLIC ANHYDRIDE

[75] Inventors: Anatoli Onopchenko; Johann G. D. Schulz, both of Pittsburgh, Pa.

[73] Assignee: Gulf Research & Development Company, Pittsburgh, Pa.

[22] Filed: May 1, 1974

[21] Appl. No.: 465,763

[52] U.S. Cl. .................................... 260/346.3
[51] Int. Cl. .................................... C07c 63/48
[58] Field of Search .......................... 260/346.3

[56] References Cited
UNITED STATES PATENTS
3,293,267   12/1966   McCracken et al. ............ 260/346.3

*Primary Examiner*—Henry R. Jiles
*Assistant Examiner*—Bernard Dentz

[57] ABSTRACT

A process for converting a diaryl ketone carboxylic anhydride to the corresponding diaryl carbinol carboxylic anhydride which involves subjecting a diaryl ketone carboxylic anhydride to hydrogenation in an ester carrier in which it is soluble.

17 Claims, No Drawings

PROCESS FOR PREPARING A DIPHENYL CARBINOL CARBOXYLIC ANHYDRIDE

In U.S. Pat. No. 3,293,267 to McCracken et al. it is shown that a diaryl ketone carboxylic acid or a corresponding anhydride in a common carrier cannot be hydrogenated to the corresponding diaryl carbinol carboxylic acid or corresponding diaryl carbinol carboxylic anhydride. The patentees found it necessary to subject an ester of a diaryl ketone carboxylic acid to hydrogenation in a selected alkanol carrier to obtain the corresponding ester of the diaryl carbinol carboxylic acid. The latter was then hydrolyzed to convert the ester to the corresponding diaryl carbinol carboxylic acid. Then the diaryl carbinol carboxylic acid was subjected to dehydration to convert the same to the corresponding diaryl carbinol carboxylic anhydride.

We have found that if a diaryl ketone carboxylic anhydride is first dissolved in a unique solvent the same can easily be converted directly to the corresponding diaryl carbinol carboxylic anhydride. The solvent must be an organic ester, liquid under the reaction conditions in which the diaryl ketone carboxylic anhydride is sufficiently soluble for reaction to occur. This includes liquid organic esters, aryl or alkyl, having from two to 12 carbon atoms, preferably from three to eight carbon atoms. Specific examples of esters that can be used are methyl formate, ethyl formate, n-propyl formate, isopropyl formate, n-butyl formate, isobutyl formate, sec-butyl formate, tert-butyl formate; methyl acetate, ethyl acetate, propyl acetate, isopropyl acetate, n-butyl acetate, isobutyl acetate, sec-butyl acetate, tert-butyl acetate, amyl acetate, phenyl acetate; methyl propionate, ethyl propionate, propyl propionate, isopropyl propionate, n-butyl propionate, isobutyl propionate, sec-butyl-propionate, tert-butyl propionate, amyl propionate; methyl butyrate, ethyl butyrate, propyl butyrate, isopropyl butyrate, chloromethyl acetate, bromomethyl acetate, fluoromethyl acetate, dichloromethyl acetate, chlorobromomethyl acetate, methoxymethyl acetate; methyl ethyl oxalate, diethyl oxalate, methyl ethyl malonate, dimethyl malonate, diethyl malonate, dipropyl malonate, diethyl succinate, diethyl adipate, etc. Of these we prefer to use ethyl acetate and methyl acetate. Diaryl ketone carboxylic anhydrides that can be converted to the corresponding carbinol include 2,3-benzophenone dicarboxylic anhydride, 3,4-benzophenone dicarboxylic anhydride, 2,3,2′,3′-benzophenone tetracarboxylic dianhydride, 3,4,3′,4′-benzophenone tetracarboxylic dianhydride, 2,3,3′,4′-benzophenone tetracarboxylic dianhydride, 4-chloro-3′,4′-benzophenone dicarboxylic anhydride, 3-bromo-4-chloro-2′,3′-benzophenone dicarboxylic anhydride, etc.

The process is easily effected. For example, the ester, the diaryl ketone carboxylic anhydride to be hydrogenated and the hydrogenation catalyst are placed into a reactor, after which the reactor is purged with hydrogen and then heated to reaction temperature. Hydrogen is thereafter introduced into the reactor until the desired hydrogen pressure range is reached. Reaction is continued for a selected period of time, during which time hydrogen is introduced, as required, to maintain a selected pressure level. Upon completion of the reaction, the reactor contents are cooled to room temperature and the reaction mixture withdrawn from the reaction zone. The contents of the reactor are then filtered to recover catalyst to be used in subsequent reductions and the filtrate evaporated in a rotary evaporator under reduced pressure at a temperature of about 25° to 30° C. until almost dryness. The solid diaryl carbinol is recovered as such by filtration followed by drying.

The weight ratio of ester solvent to diaryl ketone carboxylic anhydride can be, for example, in the range of about 99:1 to about 2:1, preferably about 95:5 to about 4:1. Hydrogenation catalysts that can be used include nickel, cobalt, copper chromite, etc. At least about two per cent by weight, preferably about five to about 10 per cent by weight, of catalyst, based on the ketone charge, will suffice. Stoichiometric amounts of hydrogen required to convert the bridge carbonyl to the desired carbinol bridge are sufficient. A hydrogen pressure of at least about 100 pounds per square inch gauge, preferably about 500 to about 1,500 pounds per square inch gauge, is sufficient. The reaction temperature can be in the range of about 100° to about 150° C., preferably about 125° to about 140° C. A contact time of at least about five minutes, preferably about 30 minutes to about three hours is sufficient.

That the reduction of a diaryl ketone carboxylic anhydride to the corresponding diaryl carbinol carboxylic anhydride is either impossible or exceedingly difficult in common carriers is seen from the following.

EXAMPLE I

A total of 150 grams of 3,4,3′,4′-benzophenone tetracarboxylic dianhydride (BTDA) and 500 milliliters of cyclohexane was charged into a one-liter, 316-stainless steel autoclave, together with 20 grams of nickel catalyst (Harshaw 0104P). The autoclave was purged twice with hydrogen, heated to 180° C. and then pressured with hydrogen to about 1,700 pounds per square inch gauge. The reaction mixture was held at the designated temperature and pressure level for two hours. The autoclave was cooled, depressured and the product removed therefrom. The product, unconverted BTDA, is poorly soluble in cyclohexane and was removed from the autoclave with difficulty. Examination of it by infrared spectroscopy gave no evidence of reaction.

EXAMPLE II

Example I was repeated except that methylcyclohexane was used in place of cyclohexane and the temperature was maintained at 220° C. The results obtained were similar to those of Example I.

EXAMPLE III

Example I was repeated with 75 grams of BTDA, 500 milliliters of benzene and 25 grams of the same nickel catalyst. The contents were held at 180° C. and a hydrogen pressure of 1,700 pounds per square inch for 0.5 hour. Analysis of the product showed no reaction had occurred.

EXAMPLE IV

Example I was repeated with 75 grams of BTDA, 500 milliliters of dimethylformamide (DMF) and 28 grams of the same nickel catalyst. The contents were held at 130° C. and a hydrogen pressure of 1700 pounds per square inch gauge for 0.5 hour. Analysis of the product showed no reaction had occurred.

EXAMPLE V

Example I was repeated with 150 grams of BTDA, 500 milliliters of tetrahydrofuran (THF) and 15 grams of the same nickel catalyst. Reaction was carried out at 200° C. and a hydrogen pressure of 1,050 pounds per square inch gauge over a period of 0.5 hour. The autoclave was cooled, depressured and the crude reaction mixture withdrawn therefrom. Filtration separated most of the product from the unreacted BTDA and catalyst. Concentration of the filtrate in a rotary evaporator, followed by cooling and partial crystallization gave a mixture of products predominating in dilactone but none of the desired benzhydrol dianhydride.

EXAMPLE VI

To explore the possibility that lower temperatures might favor the production of the desired carbinol, another run was carried out with 150 grams of BTDA, 600 milliliters of THF and 15 grams of the same nickel catalyst at a temperature of 130° C. and a hydrogen pressure of 1100 pounds per square inch gauge over a period of 1 hour. The reaction product was processed as in Example V above. Filtration resulted in the recovery of the catalyst along with 20 grams of unreacted BTDA. Concentration of the filtrate in a rotary evaporator produced a viscous glass-like liquid. The latter was permitted to stand at room temperature for 2 months. Although some solids started to form, isolation thereof was impossible. Analysis of the crude product by infrared spectroscopy and nuclear magnetic resonance spectroscopy indicated the presence of 3,4,3′,4′-benzhydrol dianhydride (BHDA) along with large amounts of by-product formed as a result of interactions between hydroxyl and anhydride functions of the BHDA molecules. The neutral equivalent of this material was found to be 113.7 (theoretical for BHDA = 81.0), corresponding roughly to BHDA.2 THF. THF could not be removed from the product entirely, even at 40° C. and a vacuum of 10 millimeters of mercury after 24 hours. This product was hydrolyzed as follows to remove the chemically bonded THF: 10 grams of residue and 50 milliliters of water were heated to reflux until a solution was obtained. During this operation THF was evolved as noted by its odor. On evaporation of about half of the water, followed by cooling, eight grams of a white precipitate was obtained. The precipitate was washed with water and dried in a vacuum oven for eight hours. The neutral equivalent of the hydrolyzed residue as 3,4,3′,4′-benzhydrol tetracarboxylic acid was 95.4 (theoretical value = 90.0).

EXAMPLE VII

Example VI was repeated except that the amount of BTDA treated amounted to 75 grams. Analysis of the product by infrared showed somewhat less ester formed than in Example VI. As in Example VI the product was found to correspond roughly to BHDA.2THF.

EXAMPLE VIII

Example VI was repeated except that the amount of BTDA treated amounted to 40 grams. Analysis of the product by infrared showed the presence of no appreciable amount of ester, although the product was again found to be BHDA.2THF. The product was heated at 40° C. in a vacuum oven for 40 hours. The product at the end of such treatment was found to be roughly BHDA.THF. Attempts to remove the solvent completely from the product were unsuccessful.

EXAMPLE IX

Example I was repeated using 75 grams of BTDA, 500 milliliters of p-dioxane and 25 grams of the same nickel catalyst at a temperature of 135° and a hydrogen pressure of 1,200 pounds per square inch gauge over a period of two hours. Analysis showed the product to be substantially an adduct of BHDA and p-dioxane. Some ester impurity was also detected.

EXAMPLE X

Example IX was repeated except that the amount of BTDA used amounted to 40 grams, the temperature was 130° C., the hydrogen pressure 1,500 pounds per square inch gauge and the reaction time one hour. On evaporation of solvent, the product was found to be an adduct containing one mol of BHDA and from one to two mols of p-dioxane.

EXAMPLE XI

Example I was repeated with 75 grams of BTDA, 500 milliliters of 2,2-dimethoxy propane and 25 grams of the same nickel catalyst at a temperature of 130° C. and a hydrogen pressure of 1700 pounds per square inch gauge over a period of 0.6 hour. The reaction was unsuccessful because the solvent decomposed into acetone and methanol, with the acetone being reduced to isopropanol.

EXAMPLE XII

This time Example I was repeated with 150 grams of BTDA, 500 milliliters of THF and 35 grams of copper chromite catalyst at a temperature of 130° C. and a hydrogen pressure of 1,600 pounds per square inch gauge over a period of three hours. On work-up some unreacted BTDA was recovered along with catalyst by filtration. The filtrate was concentrated and analyzed and found to be an adduct of BHDA and THF.

That a diaryl ketone carboxylic anhydride can readily be hydrogenated to the corresponding diaryl carbinol carboxylic anhydride if the diaryl ketone carboxylic anhydride is first dissolved in a liquid ester and that no difficulty resides in recovering the diaryl carbinol carboxylic anhydride from the reaction product is apparent from the following.

EXAMPLE XIII

Example I was repeated using 40 grams of BTDA, 500 milliliters of ethyl acetate and 20 grams of nickel catalyst (Harshaw 0104P) at a temperature of 140° C. and a hydrogen pressure of 1700 pounds pressure over a period of 0.5 hour. The autoclave was cooled, depressured and the reaction mixture withdrawn therefrom. The catalyst was recovered from the product by filtration and the filtrate concentrated in a rotary evaporator. The concentrate was permitted to stand overnight and the pale yellow solids that formed were recovered by filtration and air dried. Analysis of the product by carbon-hydrogen analysis, neutral equivalent, nuclear magnetic resonance, infrared, melting point and vapor phase chromatography proved the solids to be BHDA. Conversion of BTDA was complete and efficiency to BHDA was 90 per cent.

EXAMPLE XIV

When Example XIII was repeated using 500 milliliters of methyl acetate in place of ethyl acetate substantially identical results were obtained.

EXAMPLE XV

Example XIII was repeated using 40 grams of BTDA, 500 milliliters of amyl acetate and 25 grams of the same nickel catalyst at a temperature of 140°C. and a hydrogen pressure of 1500 pounds per square inch gauge over a period of 0.5 hour. In this case conversion was 65 per cent with efficiency to BHDA of 95 per cent.

EXAMPLE XVI

In this run 40 grams of BTDA, 500 milliliters of ethyl malonate and 25 grams of nickel catalyst (Harshaw 0104P) were heated at 140°C. at a hydrogen pressure of 1500 pounds per square inch gauge for 25 minutes. The autoclave was cooled, depressured and the reaction mixture withdrawn therefrom. The reaction mixture was filtered to remove catalyst and the filtrate was worked up in two ways. In the first work-up, about one-fourth of the filtrate was added slowly to about 600 milliliters of n-hexane, whereupon precipitation of solids occurred. The product was filtered and the solids were analyzed by infrared and shown to be BHDA. The remainder of the filtrate was evaporated almost to dryness under a pressure of 10 millimeters of mercury at a temperature of 100°C. in a rotary evaporator and, after recovery as in Example XIII, was found to be BHDA. The two crops of recovered BHDA were combined, air dried and analyzed. A total of 38 grams of BHDA of 99.8 per cent purity was recovered. Conversion of BTDA was complete and efficiency to BHDA was over 95 per cent.

Obviously, many modifications and variations of the invention, as hereinabove set forth, can be made without departing from the spirit and scope thereof and, therefore, only such limitations should be imposed as are indicated in the appended claims.

We claim:

1. A process for converting a benzophenone carboxylic anhydride to the corresponding diphenyl carbinol carboxylic anhydride which comprises subjecting said benzophenone carboxylic anhydride to hydrogenation with hydrogen in the presence of a hydrogenation catalyst while said benzophenone carboxylic anhydride is dissolved in a liquid carboxylic acid ester having from two to 12 carbon atoms.

2. The process of claim 1 wherein said ester has from three to eight carbon atoms.

3. The process of claim 1 wherein said ester is an alkyl ester.

4. The process of claim 1 wherein said ester is an aryl ester.

5. The process of claim 1 wherein said benzophenone carboxylic dianhydride is 3,4,3',4'-benzophenone tetracarboxylic dianhydride.

6. The process of claim 1 wherein the reaction is carried out at a temperature of about 100° to about 150°C. under a hydrogen pressure of at least about 100 pounds per square inch gauge.

7. The process of claim 1 wherein the reaction is carried out at a temperature of about 125° to about 140°C. and a hydrogen pressure of about 500 to about 1,500 pounds per square inch gauge.

8. The process of claim 1 wherein said ester is methyl acetate.

9. The process of claim 1 wherein said ester is ethyl acetate.

10. The process of claim 1 wherein said ester is amyl acetate.

11. The process of claim 1 wherein said ester is ethyl malonate.

12. The process of claim 1 wherein the weight ratio of ester to benzophenone carboxylic anhydride is from about 99:1 to about 2:1.

13. The process of claim 1 wherein the weight ratio of ester to benzophenone carboxylic anhydride is from about 95:5 to about 4:1.

14. The process of claim 1 wherein said hydrogenation catalyst is selected from the group consisting of nickel, cobalt and copper chromate.

15. The process of claim 1 wherein said hydrogenation catalyst is nickel.

16. The process of claim 1 wherein the hydrogenation catalyst amounts to at least about two weight per cent, based upon the benzophenone carboxylic anhydride.

17. The process of claim 1 wherein the hydrogenation catalyst amounts to about five to about 10 weight per cent, based upon the benzophenone carboxylic anhydride.

* * * * *